United States Patent [19]

McGeachy

[11] Patent Number: 4,765,385
[45] Date of Patent: Aug. 23, 1988

[54] TIRE INFLATION-DEFLATION SYSTEM
[75] Inventor: Donald E. McGeachy, Milford, Mich.
[73] Assignee: Numatics, Incorporated, Highland, Mich.
[21] Appl. No.: 19,940
[22] Filed: Feb. 27, 1987
[51] Int. Cl.⁴ .............................................. B60C 29/02
[52] U.S. Cl. ................................ 152/416; 137/116.3; 137/224
[58] Field of Search ............................ 152/415–419, 152/424–426; 137/102, 116.3, 224, 224.5

[56] References Cited

U.S. PATENT DOCUMENTS

| | | | |
|---|---|---|---|
| 1,805,397 | 5/1931 | Harris | 137/224.5 |
| 1,937,038 | 11/1933 | Ingram | 137/224 |
| 2,015,882 | 10/1935 | Brewer | 137/224 |
| 2,177,042 | 10/1939 | Michael | 152/416 |
| 2,634,781 | 4/1953 | Turek | 137/224 |
| 2,989,989 | 6/1961 | Whaley et al. | 152/416 |
| 4,685,501 | 8/1987 | Williams | 152/417 |

Primary Examiner—Richard V. Fisher
Assistant Examiner—Richard D. Jordan
Attorney, Agent, or Firm—Barnes, Kisselle, Raisch, Choate, Whittemore & Hulbert

[57] ABSTRACT

A pressure-controlled remotely-operated valve for utilization in respective wheels of a vehicle, on-road, off-road type. The valve is functional to effect tire deflation or tire inflation in a stationary or moving vehicle. Multiple piston-valve elements are axially aligned in a multi-step recess of a housing, wherein the effective areas of two opposed valves differ in value whereby a first valve movable in a two-stage phase can move a second valve only under certain tire pressure conditions. A third valve operable by said first valve can connect tire pressure to exhaust upon action of the first valve in a first phase operation.

5 Claims, 2 Drawing Sheets

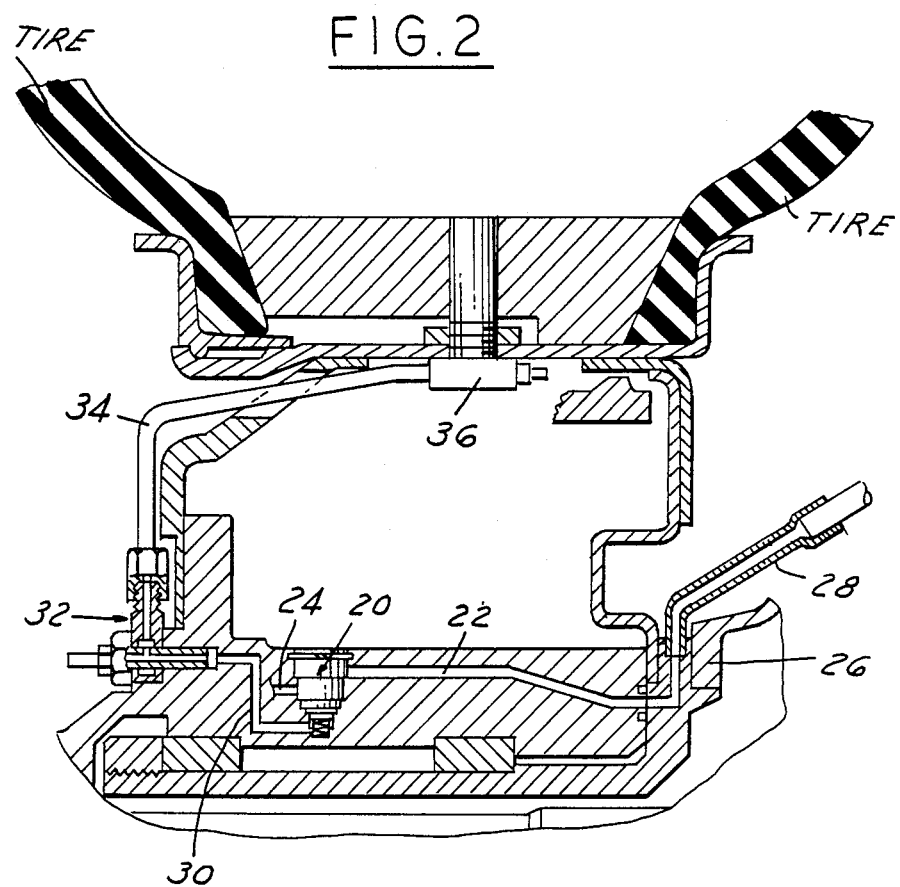

TIRE INFLATION-DEFLATION SYSTEM

FIELD OF INVENTION

Tire inflation-deflation devices utilized on moving vehicles.

BACKGROUND AND OBJECTS OF THE INVENTION

With some vehicles used in construction work and military activitiy, it is desirable to be able to change the tire inflation from a regulated pressure for on-road operation to a lower pressure for off-road travel in terrain that may be soft and marshy or have other characteristics which require more tire surface for support or additional traction.

With these requirements, it is also desirable for an operator to be able to control the tire pressure while the vehicle is moving. The vehicle will have an air compressor and a dashboard control to cause inflation or deflation of the tires.

It is an object of the present invention to provide a relatively simple valve to be carried by each wheel of the vehicle. The valves are designed to be operated by a single, remotely-controlled pilot pressure line from a multiple pressure selection module.

Objects and features of the invention will be set forth in the following description and claims in which the principles of the invention are set forth together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 2, a partial section of a vehicle wheel illustrating the location of the control valve.

DETAILED DESCRIPTION OF THE INVENTION AND THE MANNER AND PROCESS OF USING IT

Figure 1:
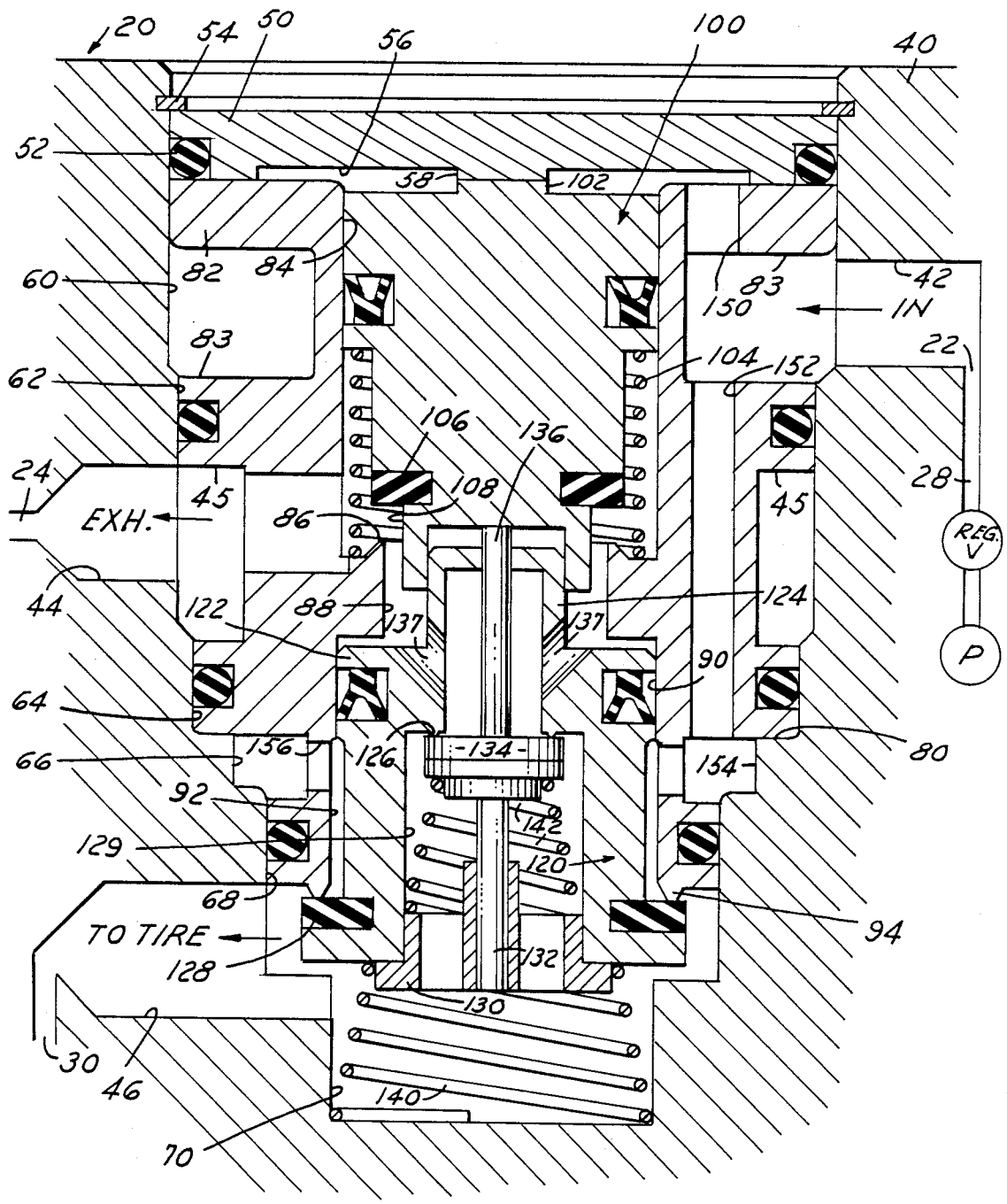
FIG. 1, a sectional view of a valve for incorporation in a vehicle wheel.

With reference to the drawings, FIG. 2 illustrates a partial section of a vehicle wheel hub and rim with a tire mounted on the rim. An inflation valve housing 20 is mounted in the wheel hub with an air passage 22 leading to the valve housing and an exhaust passage 24 leading from the housing. A stationary hub 26 carries a pilot and air supply line 28 which has a moving sealed connection to the valve line 22 in a manner common to this type of wheel and vehicle. A third line 30 leads to a fixture 32 connected to line 34 opening to the interior of the tire through a suitable fixture 36.

In FIG. 1, a valve housing 40 has an inlet 42 connected to pressure and control passage 22. An exhaust port 44 connects to exhaust passage 24. A functional passage 46 in the housing opens to line 30 leading to the tire.

The housing 40 has a deep valve recess open at the top and having a six-step form of decreasing diameter, axially aligned sections. The top of the recess is closed and sealed by a disc 50 carrying an O-ring 52 and retained by a split ring 54. The disc 50 has an annular recess 56 in the lower surface which leaves an annular ridge at the outer circumference and a central projection 58. The disc 50 is positioned in the uppermost and largest section 60 of the valve recess. The subsequent sections decreasing in size are 62, 64, 66, 68 and 70.

A shoulder 80 between the step sections 64 and 66 supports the lower end of a stationary three-land cartridge 82. The upper land abuts the outer periphery of the closure disc 50 and the lower two lands carry O-rings to seal against the wall of the housing. The lands have decreasing diameters from the top to fit, respectively, the sections 60, 62 and 64. In the larger land is an annular passage 83 which registers with the inlet 42. In the second land is an annular passage 45 which registers with exhaust port 44.

The cartridge 82 has a first, top, central cylindrical recess 84 which terminates in an annular valve seat 86 surrounding a second cylindrical recess 88 which enlarges into a third cylindrical recess 90 open to the bottom of the cartridge 82. The recess 90 enlarges slightly at 92 and terminates in an annular valve seat 94.

Within the recess 84 is a piston-valve 100 carrying a ring seal in a side groove. On the top of the piston-valve is a small, central protrusion 102. A shoulder on the head of the piston-valve 100 is biased upwardly by a coil spring 104. An annular groove below the head of piston 100 carries a sealing ring 106 below which is an ensmalled projection formed as annular thin walls 108 with a cylindrical recess open at the bottom. Thus, the piston-valve 100 is guided in recess 84 by the head portion carrying the ring seal and the midportion carrying the seal ring 106 functions with the valve seat 86.

A secondary hollow valve-piston 120 has a head portion 122, carrying a ring seal in any appropriate groove, slidable in the third cylindrical recess 90 in cartridge 82. This head portion has a small hollow turret 124 with a cylindrical opening terminating in an annular valve seat 126. A flanged portion of piston-valve 120 below an annular recess carries a valve seal ring 128. The interior 129 of the lower end of the valve-piston 120 carries a flanged spider ring 130 which fits into the recess of valve-piston 120, the flange seating against the base of element 120. The center of the spider ring has a guide tube which receives the lower stem 132 of a poppet type valve element 134. An upper stem 136 is guided in a central hole in the top of the turret 124. Four angled passages 137 at the base of the turret are open to the annular recess 45 and to the exhaust passage 44.

A coil spring 140 seats in the bottom of housing recess 70 and bears against the lower end of the piston valve 120 around the spider ring 130. Another coil spring 142 seats on the top of the spider ring 130 and bears against the poppet valve 134. Thus, all of the movable elements 100, 120 and 134 are biased upwardly by the respective springs 104, 140, and 142.

IN THE OPERATION

When the tire of a particular wheel is fully inflated, the parts will be in the position shown in the drawing. Tire pressure in conduit 30 and port 46 passes around piston-valve 120 below the seal ring 128 and into the chamber 70, holding the piston-valve 120 in a sealing relation to valve seat 94, and also through spider plug 130 into chamber 129 holding sealing ring 134 in sealing relation to valve seat 126. The vehicle is equipped with an air compressor and a pressure regulator valve R so pressure in line 22 and "IN" port 42 can be controlled. For illustrative purposes, we can assume that the tire pressure is 80 pounds per sq. inch and a lower pressure of 60 pounds per sq. inch is desired.

When it is desired that a tire be deflated, signal pressure, for example, 60 pounds per sq. inch, is introduced into passage 22 and passes immediately through passage 150 to the top of piston-valve 100. Signal pressure also passes through passage 152 to the annular passage where it is momentarily blocked at seat 94. The pressure on piston 100 moves piston 100 down because of its larger area. Movement of this piston element 100 downward moves the stem 136 down and opens the poppet valve seat 126 against spring 142 by contact with and motion of stem 136 actuated by element 100. The downward motion of piston-valve 100 is limited at this time by contact with the top of turret 124 so that at this point the valve seat ring 106 is not in contact with seat 86. The pressure area on the top of the valve piston is less than the effective pressure area on the bottom of piston-valve 120 so valve seat 94 remains closed. Opening of poppet 134 will admit tire pressure from port 46 through bottom chamber 70 and through the angled passages 137 and past the seat 86 to the exhaust passages 44 so that the tire may deflate to a pressure, for example, of 55 pounds per sq. inch. When the tire pressure on piston-valve 120 at seat 94 is less than that at the top piston area of piston 100, then the top piston will move further downward to mechanically shift piston-valve 120 to open seat 94 and at the same time the seal 106 will contact and close seat 86. With the lower piston 120 opening the seat 94, the signal pressure through axial passage 152 via annular passage 154 enters the tire and the pressure in the tire stabilizes at 60 pounds per square inch.

When the pilot line is exhausted, the top piston 100 will return to its up position by action of spring 104 and the system is again stabilized (seats 86 and 94 close) at the desired 60 pounds per square inch in the tire. When the pilot control inflation pressure is exhausted to atmosphere, all valves will return to the original position and pressure will be sealed in the tire at seat 94.

When it is desired to re-inflate a tire after total or partial deflation, pressure is again introduced from a vehicle pressure source to the line 22 and port 42. The effective area of the top of piston 100 is smaller than the effective area on lower piston 120 at the seat 94. When pilot control pressure is introduced to line 22 and port 42, it will pass immediately through the larger passage 150 to the top of piston 100 and also is metered through passage 152 to section 66 of the valve recess and around piston-valve 120 to the seat area 94. Pressure has already reached the top of piston 100 and piston 100 moves down to contact the top of turret 124. Since the tire pressure is lower than the pilot pressure in this phase of the operation, the combined pressures on piston 100 cause shifting of piston 120 downward against spring 140. This opens the pilot control pressure to the tire conduit and the tire will be inflated to the desired pressure. The release of the pilot pressure causes piston 120 to close seat 94. When the pilot control inflating pressure is exhausted to atmosphere, all valves will return to the original position and pressure will be sealed in the tire at the seat 94.

In general terms, when the pilot pressure introduced into line 22 is less than that in the tire, the valve seat 94 remains closed because it has a higher pressure area acting on it than is acting on the top of piston 100. But piston 100 can move down to contact stem 136 and open the small poppet to release tire pressure. Piston 100 cannot move to shift the lower piston valve 120 until the pressure in the tire is reduced below the pilot control pressure in line 22. When a pressure is introduced into line 22 which is higher than the pressure in the tire, the top piston 100 can move the lower piston valve 120 and admit higher pressure to the tire.

What I claim is:

1. A valve combination for installation in the hub of a vehicle wheel for remote control of the inflation and deflation of a vehicle tire on said wheel in conjunction with a vehicle mounted pneumatic pressure source and pressure regulator which comprises:

(a) a valve housing having a generally cylindrical opening with longitudinally spaced wall ports in said cylindrical opening comprising an air inlet, an exhaust outlet, and a tire inlet-outlet, (b) an axially extending passage in said housing connected to said pressure inlet and open to said tire inlet-outlet port and one end of a third valve, (c) a first valve, a second valve and a third valve axially movable in said cylindrical opening of said valve housing, (d) said first valve and said third valve being slidable in opposite ends of said cylindrical opening, (e) means on said first valve to close said tire inlet-outlet port from said pressure passage in a first position of said first valve and to open said tire inlet-outlet port to said pressure passage in a second position of said first valve, (f) means on said third valve to close said exhaust outlet port in a first position and to open said exhaust outlet port in a second position, (g) said second valve being mounted in said first valve cooperating with a seat in said first valve to open and close said tire inlet-outlet port in relation to said exhaust port, (h) said first valve having an effective area exposed to said tire inlet-outlet greater than the effective area of said one end of said third valve, (i) means on said first valve and on said third valve to limit initial shifting of said third valve by pressure in said pressure passage, and (j) means on said third valve and said second valve to effect shifting on said second valve in response to said initial shifting of said third valve to open said tire inlet-outlet port to exhaust port, whereby pressure in said pressure passage will shift said third valve to a second position to move said first valve to a second position opening said pressure passage to said tire inlet-outlet passage to allow equalization of pressure in said tire and in said pressure passage.

2. A valve combination for installation in the hub of a vehicle wheel for remote control of the inflation and deflation of a vehicle tire on said wheel in conjunction with a vehicle mounted pneumatic pressure source and pressure regulator which comprises:

(a) a valve housing having a generally cylindrical opening with longitudinally spaced wall ports in said cylindrical opening comprising an air inlet, an exhaust outlet, and a tire inlet-outlet, (b) a valve sleeve having a cylindrical bore mounted in said cylindrical opening having spaced air inlet, exhaust outlet, and tire inlet-outlet ports to register with said same ports in said valve housing, (c) annular sealing means between said valve housing and said valve sleeve isolating said respective ports from each other, (d) an axially extending pressure passage in said sleeve connected to said pressure inlet and open to said tire inlet-outlet port and to one end of a third valve, (e) a first valve, a second valve, and a third valve each shiftable to open and closed positions and axially movable in said cylindrical bore of said valve sleeve, said first and second valves being spring biased to closed positions and said third valve being spring biased to open position, (f) said first valve and said third valve being slidable in opposite ends of said cylindrical bore, (g) means on said first valve to close said tire inlet-outlet port from said pressure passage in a first position of said first valve and to open said tire inlet-outlet port to said pressure passage in a second position of said first valve, (h) means on said third valve to close said exhaust outlet port in a first position and to open said exhaust outlet port in a second position, (i) said second valve being mounted in said first valve cooperating with a seat in said first valve to open and close said tire inlet-outlet port in relation to said exhaust port, (j) said first valve having an effective area exposed to said tire inlet-outlet greater than the effective area of said one end of said third valve, (k) means on said first valve and on said third valve to limit initial shifting of said third valve by pressure in said pressure passage, and (l) means on said third valve and said second valve to effect shifting of said second valve in response to said initial shifting of said third valve to open said tire inlet-outlet port to exhaust port, whereby pressure in said pressure passage will shift said third valve to a second position to move said first valve to a second position opening said pressure passage to said tire inlet-outlet passage to allow equalization of pressure in said tire and in said pressure passage.

3. A valve combination as defined in claim 2 in which said first valve and said third valve having telescoping portions intermediate the ends of said cylindrical bore providing limited axial movement of said third valve relative to said first valve, said second valve being slidably mounted in said first valve cooperating with a seat in said first valve, and a stem on said second valve extending to said third valve to be actuated by said limited movement of said first and third valves to open said seat and connect said tire inlet-outlet port to exhaust passages in said first valve and said housing.

4. A combination as defined in claim 3 in which said first valve has a central projecting turret received in and guided by a recess in an end of said third valve, and said second valve has a stem protruding from said turret to contact said third valve within said recess.

5. A combination as defined in claim 4 in which said turret has wall passages open to said exhaust port when said third valve is open wherein initial actuation of said valve stem by said third valve will open said tire inlet-outlet port to the exhaust port.

* * * * *